United States Patent
Collette et al.

(10) Patent No.: US 8,844,595 B2
(45) Date of Patent: Sep. 30, 2014

(54) PNEUMATIC TIRE WITH TREAD INCLUDING TREAD BASE LAYER AND TREAD BLOCKS HAVING TWO DIFFERENT RUBBER LAYERS

(75) Inventors: Jacques Collette, Bastogne (BE); Peter Johann Cornelius Maus, Bullingen (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 518 days.

(21) Appl. No.: 12/956,228

(22) Filed: Nov. 30, 2010

(65) Prior Publication Data

US 2012/0132331 A1    May 31, 2012

(51) Int. Cl.
*B60C 11/00* (2006.01)
*B60C 11/11* (2006.01)

(52) U.S. Cl.
CPC ........... *B60C 11/005* (2013.01); *B60C 11/0058* (2013.01); *B60C 2200/06* (2013.01); *B60C 2011/0025* (2013.01)
USPC .................................. 152/209.5; 152/209.18

(58) Field of Classification Search
CPC ........................... B60C 11/005; B60C 11/0058
USPC .......................................... 152/209.5, 209.18
See application file for complete search history.

(56) References Cited

U.S. PATENT DOCUMENTS

| | | | |
|---|---|---|---|
| 4,226,274 A | 10/1980 | Awaya | |
| 4,683,928 A * | 8/1987 | Yahagi | 152/209.5 |
| 5,176,765 A | 1/1993 | Yamaguchi | |
| 6,474,382 B1 * | 11/2002 | Finck | 152/209.5 |
| 6,959,743 B2 | 11/2005 | Sandstrom | |
| 2004/0118495 A1 * | 6/2004 | Sandstrom et al. | 152/209.5 |
| 2006/0048874 A1 | 3/2006 | Maruoka | |

FOREIGN PATENT DOCUMENTS

| | | | |
|---|---|---|---|
| DE | 19731525 | | 7/1998 |
| DE | 19731525 A1 * | | 7/1998 |
| EP | 105822 A2 * | | 4/1984 |
| EP | 594045 A1 * | | 4/1994 |
| EP | 0594045 | | 7/1994 |
| EP | 864446 A1 * | | 9/1998 |
| JP | 59-124414 A * | | 7/1984 |
| JP | 04-081304 A * | | 3/1992 |
| JP | 2000-198322 A * | | 7/2000 |
| JP | 2005-075201 A * | | 3/2005 |

OTHER PUBLICATIONS

Machine translation for Japan 2005-075201 (no date).*
Machine translation for Europe 594045 (no date).*
Machine translation for Germany 19731525 (no date).*
Machine translation for Japan 04-081304 (no date).*
Machine translation for Japan 2000-198322 (no date).*

* cited by examiner

*Primary Examiner* — Steven D Maki
(74) *Attorney, Agent, or Firm* — David L King

(57) ABSTRACT

The present invention is directed to a pneumatic tire 1 comprising at least one pair of parallel annular beads; at least one carcass ply 3 wrapped around said beads; a tread 5; and first and second sidewalls disposed between said tread and one of said at least one pair of beads; as well as a belt portion 7 between the carcass ply 3 and the tread 5. In accordance with the invention, the tread 5 comprises a tread base layer 8 and a plurality of tread blocks 9, wherein the tread blocks 9 comprise at least two different rubber layers 15, 17, 19 arranged radially above each other, whereas the rubber layers 15, 17, 19 of different tread blocks are axially separate from each other.

3 Claims, 2 Drawing Sheets

PNEUMATIC TIRE WITH TREAD INCLUDING TREAD BASE LAYER AND TREAD BLOCKS HAVING TWO DIFFERENT RUBBER LAYERS

FIELD OF THE INVENTION

The present patent application is directed to a pneumatic tire comprising a multi-layer tread cap.

BACKGROUND OF THE INVENTION

In normal production of pneumatic tires, the extruded tread consists of only two compound parts, i.e. the cap and the base compound. Sometimes a calendared cushion is put on the base compound to avoid tack problems in tire building.

EP 1 398 182 A2 discloses a tire having a multi-layered tread. In detail, the respective tire comprises a tread base layer, an intermediate layer, and a cap layer comprising lugs and grooves. The tread cap layer comes into contact with the road, wherein the intermediate layer extends to and includes a visible bottom portion of said grooves in said cap layer. Furthermore, said intermediate layer is comprised of a carbon black-rich rubber compound. However, the intermediate layer is not intended to contact the street upon normal wear of the tire.

Document U.S. Pat. No. 5,176,765 discloses a pneumatic tire having an outer tread layer of foam rubber in order to prevent crack occurrence at groove bottoms. Furthermore, the tread shall improve tire performances for both summer and winter. In accordance with this publication, the tread portion is composed of an outer foam rubber layer and an inner ordinary layer, whereas the hardness of the inner rubber layer is higher than the hardness of the outer rubber layer so that it is possible to reduce on the one hand a change in groove width after vulcanization and on the other hand dynamic strain concentration during travel in this region.

Document EP 1 630 003 A1 discloses a heavy-duty pneumatic tire and a method of producing the same preventing the occurrence of wrinkles and cracks on groove bottoms of the main grooves. The tread of the tire comprises a cap layer disposed on an outermost side in a radial direction of the tire and radially below the cap layer a middle layer and yet below the middle layer the tread base layer. In accordance with this tire all three layers extend essentially over the complete axial width of the tread, i.e. from the inner shoulder region of the tire to the outer shoulder region of the tire.

In view of the above cited prior art still room for improvement remains. In particular, it would be favorable to adapt the tread even better to performance or durability requirements.

SUMMARY OF THE INVENTION

Thus, it is an object of the invention to provide a tire with still better controllable or adjustable performance and/or durability, or with a higher variability in design parameters in general.

In an embodiment of the invention, the pneumatic tire comprises at least one pair of parallel annular beads; at least one carcass ply wrapped around said beads; a tread; first and second sidewalls disposed between said tread and one of said at least one pair of beads; and a belt portion between the carcass ply and the tread. Still in accordance with the invention, the tread comprises a tread base layer and tread blocks, wherein at least a plurality of said tread blocks comprises at least two different rubber layers arranged radially above each other and extending over the axial width of the tread blocks. Furthermore, the rubber layers of different tread blocks are separate from each other in an axial direction.

In contrast to the prior art, the rubber layers forming the tread blocks do not connect different tread blocks axially with each other. This means that said rubber layers are only part of the tread blocks. This feature in combination with different rubber layers arranged radially above each other in the tread blocks, results in a better control of the properties and performance of the tire. In contrast, prior art tires show e.g. intermediate tread layers extending from one shoulder of the tire to the other. However, this can negatively influence the dynamic properties of the tire, particularly when different layers of rubber material are used in each tread block for adjusting the properties of the tread. For example, the tread block could comprise rubber layers having compounds with different degrees of stiffness. According to the prior art, the radially lowest rubber layer forming an essential part of the tread blocks would be the same across the whole axial width of the tire resulting in a reduced possibility of an exact adjustment of the tread properties via multiple rubber layers in the tread blocks.

In an aspect of the invention, the tread blocks comprise center tread blocks and shoulder tread blocks, wherein at least for a plurality of the center tread blocks, the rubber layers extend over the whole axial width of the tread blocks. The feature of said rubber layers extending over the whole axial width of the tread blocks improves the performance of the tire, because only the intended layer comes into contact with the street upon wear of the tire. Radially upper layers which may have become unfavorable after a certain time of use do not come into contact with the road anymore as it is the case in the prior art.

In accordance with another aspect of the invention, at least the center tread blocks comprise three different rubber layers arranged radially above each other and extending over the whole axial and/or circumferential width of the tread blocks. Providing even three different rubber layers in each tread block improves adjustability of the tread properties as well. In particular, the different rubber material could be adapted to the aging of the layers upon wear of the tire during service.

In accordance with another aspect of the invention, all of said rubber layers are adapted to come successively into contact with the road upon (normal) wear. This feature makes clear that all rubber layers are intended to get into contact with the road during their normal service.

In accordance with another aspect of the invention, the rubber layers have essentially the same radial width. Among others, this feature clarifies that all rubber layers have a substantial influence on the mechanic and dynamic properties of the tread.

In accordance with still another aspect of the invention, a first rubber layer coming first into contact with the street has a 5% to 10% higher hardness than a second rubber layer adjacent and radially below the first rubber layer, and optionally, each further rubber layer radially below the second rubber layer has a 5% to 10% lower hardness than the upper adjacent rubber layer. This is one advantageous example of varying the properties of the rubber layers to influence the performance of the tire.

In accordance with still another aspect of the invention, a first rubber layer coming first into contact with the street has a 5% to 10% higher tear resistance than a second rubber layer adjacent and radially below the first rubber layer, and optionally, each further rubber layer radially below the second rubber layer has a 5% to 10% lower tear resistance than the upper adjacent rubber layer. This, is another example of an improved tire if tear resistance is of major interest, in particular for heavy duty tires.

Furthermore, the invention may also be directed to a method of manufacturing a tire in accordance with one or more of the above mentioned aspects, comprising at least the steps of providing at least one pair of parallel annular beads and at least one carcass ply wrapped around said beads, providing a belt portion radially above the carcass ply, and extruding tread layers including a tread base layer radially above the belt portion and further including at least two rubber layers forming tread blocks.

In one aspect of the method, the at least three rubber layers are extruded by means of a gear pump process. A gear pump process may be preferable for producing the tire in accordance with the invention. The use of gear pumps as such is known in the state of the art. For the present invention this process allows for an exact application of rubber layers forming the tread blocks.

In another aspect of the method, the rubber layers of at least the center tread blocks are extruded as essentially circumferential strips, each strip having essentially the axial width of the tread blocks.

In yet another aspect of the method, the method comprises the further step of extruding a third rubber layer extending over the axial width of the tread blocks.

Finally, it is mentioned that all features of the above mentioned aspects could be combined with each other resulting also in embodiments in the scope of the present invention.

DEFINITIONS

As used herein and in the claims,

"Axial" and "axially" refer to directions which are parallel to the axis of rotation of a tire "Radial" and "radially" refer to directions that are perpendicular to the axis of rotation of a tire;

"Bead" refers to that part of a tire comprising an annular tensile member, the bead core, wrapped by ply cords and shaped, with or without other reinforcement elements to fit a designed tire rim;

"Breaker" refers to an annular layer or ply of parallel cords, woven or unwoven, underlying the tread, not anchored to the bead;

"Carcass" refers to the tire structure apart from the belt structure, tread, and sidewall rubber but including the beads, (carcass plies are wrapped around the beads);

"Circumferential" refers to lines or directions extending along the perimeter of the surface of the annular tread perpendicular to the axial direction;

"Crown" refers to substantially the outer circumference of a tire where the tread is disposed;

"Equatorial plane (EP)" refers to a plane that is perpendicular to the axis of rotation of a tire and passes through the center of the tire's tread; and "Ply" refers to a continuous layer of rubber coated parallel cords.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE INVENTION

Figure 1:
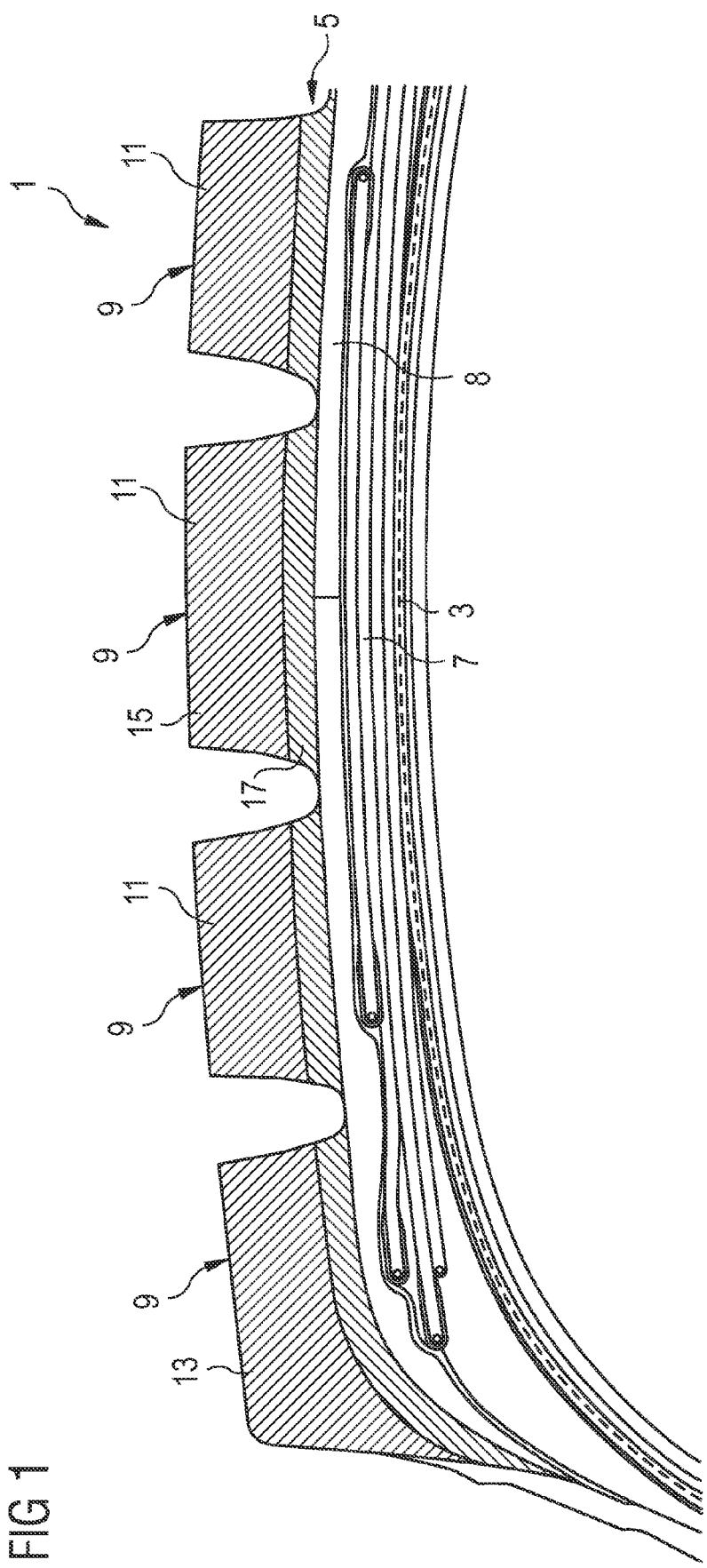
FIG. 1 is a cross-sectional view of a tire's crown according to an embodiment of the invention.

The following language is of the best presently contemplated mode or modes of carrying out the invention. This description is made for the purpose of illustrating the general principles of the invention and should not be understood in a limiting sense. The scope of the invention is best determined by reference to the appended claims. The reference numerals as depicted in the drawings are the same as those referred to in the specification.

FIG. 1 shows a cross-sectional view of a part of a tire's crown in accordance with the invention. The depicted tire 1 comprises a carcass ply 3, a tread 5, and a belt portion 7. The tread 5 comprises multiple parts, i.e. the tread base layer 8 and further rubber layers 15, 17 in the tread blocks 9 of the tread 5. For the sake of a better characterization it is distinguished between center tread blocks 11 and shoulder tread blocks 13. Shoulder blocks 13 are the axially outermost tread blocks in the shoulder area of the tire 1. The amount, form, and shape of rubber material in these shoulder tread blocks 13 may be different from that in the center tread blocks 11.

The center tread blocks 11 comprise a first rubber layer 15 extending over the whole tread block 11. Furthermore, the center tread blocks 11 comprise a second rubber layer 17 radially below the first rubber layer 15, the second rubber layer 17 extending over the whole tread block 11 as well. It is remarked that the rubber layers 15, 17 of different tread blocks are not connected with each other in an axial direction. In particular, the radially innermost rubber layers of the tread blocks do not connect the tread blocks with each other. Furthermore, the base layer 8 does not form a part of the tread blocks 11. As also indicated in FIG. 1, both rubber layers 15, 17 of the tread block will come into contact with the road during normal wear of the tire's tread 5. Hence, in accordance with the invention, it is possible to provide subsequent rubber layers 15, 17 in the tread blocks comprising each a different compound. As already described above, this could be rubber layers with different degrees of hardness which may improve tire performance upon wear of the tire in the course of time. It might be also possible, to provide layers with decreasing tear resistance, as also described above. Furthermore, two or three properties of a tire could be addressed by different rubber layers in a tread block 9. For example, a radially upper layer may comprise a compound suitable for a high mileage. Compounds of lower layers could then be designed for low heat generation during service of the tire 1. Such a design can help to build a tire having a good durability. Thus, there are at least three different layers for designing the properties of the tire 1 and its tread 5 (the tread base layer 5 and the rubber layers 15, 17), whereas the rubber layers of the tread blocks are axially decoupled from each other allowing even for a better influence of tire performance. Although some advantageous possibilities of choosing specific rubber layers 15, 17 have been outlined above others are possible to achieve improvement for a given aim, as e.g. improving chip/chunk, wet skid, handling, or noise, etc.

In general, the features in accordance with the invention allow for another degree of freedom, i.e. an axial variation of rubber compounds in the tire's tread 5. For example, it is possible to provide tread blocks 11 each comprising different layers of different rubber material. For example rubber material in the area of the shoulder could be harder than material near the equatorial plane of the tire 1. Thus, it is possible to provide tread blocks with different sequences of rubber layers over the axial width of the tire.

In general, the rubber layers may have a radial thickness of at least 1 mm, preferably comprised between 2 mm and 8 mm, or even more preferably, comprised between 3 mm and 4 mm.

The tread 5 as shown in FIG. 1 could be extruded by a triplex extruder. Alternatively, a gear pump could be used to extrude single strips of rubber material forming the tread blocks. At least the center blocks could be extruded as strips having an axial width comprised between 1 cm and 4 cm, preferably between 2 cm and 3 cm.

Figure 2:
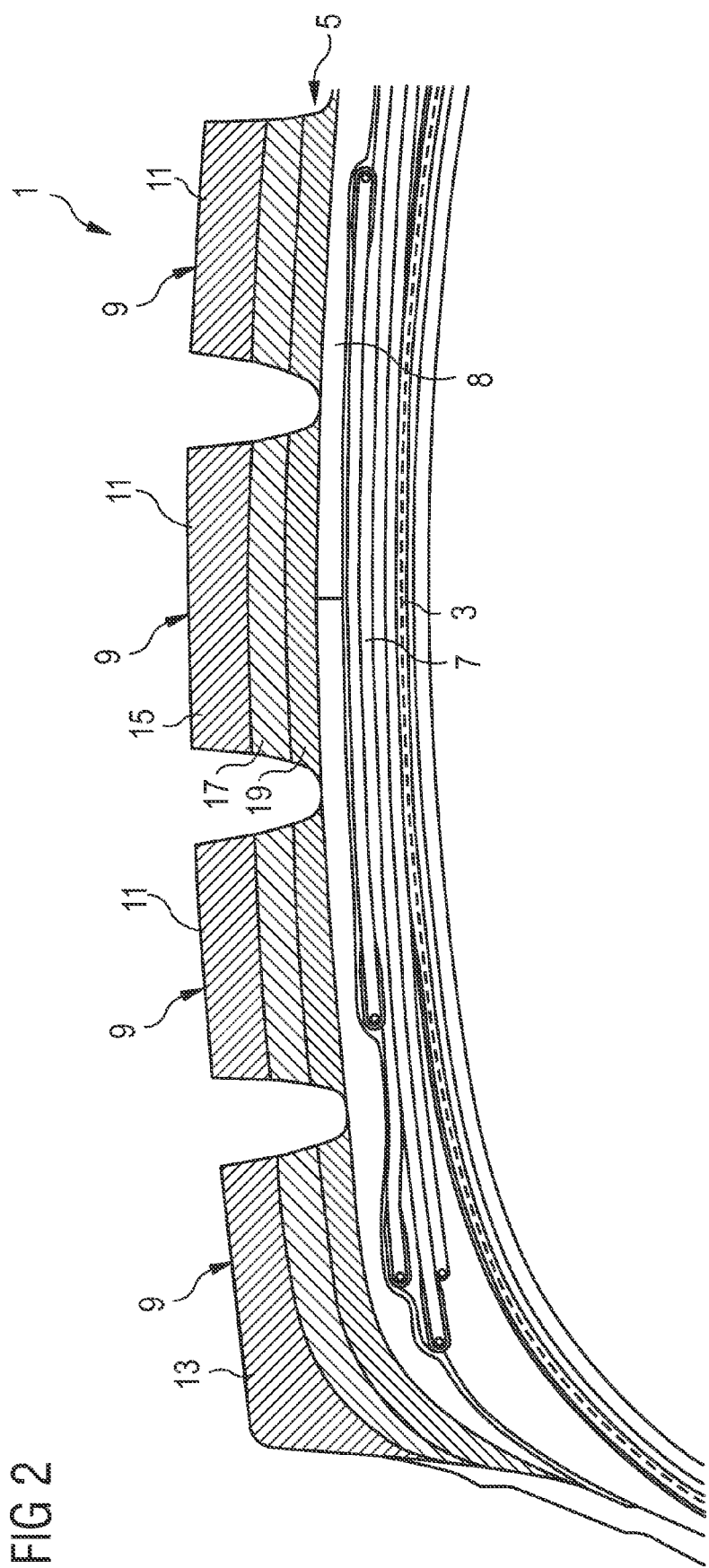
FIG. 2 is a cross-sectional view of a tire's crown according to another embodiment of the invention.

FIG. 2 depicts another embodiment in accordance with the invention. The same reference numerals as in FIG. 1 have been used. According to the depicted embodiment, the tire 1 comprises four tread layers, i.e. the tread base layer 5 and three rubber layers 15, 17, 19 comprised in the tread blocks 9. As already mentioned in connection with FIG. 1, all rubber layers extend over the axial width of each tread block and are not connected with each other allowing for a more precise control of the tire's performance.

As in relation to FIG. 1, the rubber layers may have a radial thickness of at least 2 mm, preferably comprised between 3 mm and 8 mm, or even more preferably comprised between 3 mm and 4 mm.

The tread 5 as shown in FIG. 2 could be extruded by a quadruplex extruder. Alternatively, a gear pump could be used to extrude single circumferential strips of rubber material for forming the tread blocks. At least the center tread blocks 11 could be extruded as strips having an axial width comprised between 1 cm and 4 cm, preferably between 2 cm and 3 cm.

The invention has been described with reference to a best mode. Obviously, modifications and alterations will occur to others upon reading and understanding of this specification. It is intended to include all such modifications and alterations in so far as they come within the scope of the appended claims or the equivalents thereof.

The invention claimed is:

1. A pneumatic tire comprising:
at least one pair of parallel annular beads;
at least one carcass ply wrapped around said beads;
a tread;
first and second sidewalls each disposed between said tread and one of said at least one pair of beads; and
a belt portion between the carcass ply and the tread,
wherein the tread comprises a tread base layer and tread blocks, the tread blocks have two different rubber layers arranged radially above each other, and wherein the rubber layers of different tread blocks are separate from each other in an axial direction, the tread blocks being arranged in circumferential rows across the axial width of the tread have center tread blocks and shoulder tread blocks and wherein at least for a plurality of the center tread blocks, the rubber layers extend over the whole axial width of the tread blocks, and wherein the center tread blocks have different layers of rubber material compared to the shoulder tread blocks, the shoulder tread block layers each being of a higher hardness than the respective axially inner rubber layers of the center tread blocks and wherein each tread block has a first rubber layer coming first into contact with a street and having a 5% to 10% higher hardness than a second rubber layer adjacent and directly radially below the first rubber layer, wherein the tread has a higher hardness in the axially outer shoulder block elements relative to the axially inner center block elements throughout the tread life and the hardness decreases in the radially inner second rubber layer as the tread wears, wherein the first rubber layer coming first into contact with a street has a 5% to 10% higher tear resistance than the second rubber layer adjacent and radially below the first rubber layer, wherein each of the two rubber layers have a radial thickness between 3 mm and 8 mm and in each shoulder and center tread blocks each first layer has the same radial thickness and each second layer has the same radial thickness.

2. The tire according to claim 1, wherein, each of said first and second rubber layers are adapted to come into contact with a road upon wear of the tire.

3. The tire according to claim 1, wherein each rubber layer has a radial thickness between 3 mm and 4 mm.

* * * * *